United States Patent [19]
Garman

[11] Patent Number: 5,819,237
[45] Date of Patent: Oct. 6, 1998

[54] SYSTEM AND METHOD FOR DETERMINATION OF INCREMENTAL VALUE AT RISK FOR SECURITIES TRADING

[75] Inventor: Mark B. Garman, Orinda, Calif.

[73] Assignee: Financial Engineering Associates, Inc., Berkeley, Calif.

[21] Appl. No.: 600,685

[22] Filed: Feb. 13, 1996

[51] Int. Cl.[6] .................................................. G06F 17/60
[52] U.S. Cl. .............................................................. 705/36
[58] Field of Search ................................. 705/35, 36, 37, 705/38

[56] References Cited

U.S. PATENT DOCUMENTS 5,446,885  8/1995  Moore et al. .

FOREIGN PATENT DOCUMENTS 401203     5/1990   European Pat. Off. .
WO96/30850 10/1996  WIPO .

OTHER PUBLICATIONS

Beckström, Rod and Campbell, Alyce, "An Introduction to VaR", 1995 C•ATS Software, Inc.
Kalra, Anu, "Measuring Value–at–Risk", Learning Curve, Derivatives Week, Sep. 26, 1994.
Morgan, J.P., "Latest Developments in RiskMetrics", Risk Magazine Annual Congress, Morgan Guaranty Trust Company, Jan. 25, 1996.
Morgan, J.P., "Introduction to RiskMetrics", Morgan Guaranty Trust Company, Market Risk Research, Oct. 6, 1994.
Morgan, J.P., "RiskMetrics™—Technical Document", Third Edition, Morgan Guaranty Trust Company, Global Research, May 26, 1995.

*Primary Examiner*—Robert A. Weinhardt
*Assistant Examiner*—Phillip Groutt
*Attorney, Agent, or Firm*—Fenwick & West LLP

[57] ABSTRACT

A system, method, and product determines the incremental impact of any number of candidate trades on the value at risk (VaR) measure of a trading portfolio within a trading interval, without requiring that the VaR measure be redetermined individually with respect to each candidate trade. The method includes determining the VaR measure for the trading portfolio, and determining a derivative vector quantity for the VaR measure. For each candidate trade, the impact of the candidate trade on the VaR measure is determined as the vector product of the derivative vector and the mapped cashflows of the candidate trade. A negative sign indicates a desirable reduction in the VaR measure. This determination may be made for any number of candidate trades without having to re-determine the VaR measure. The software product employs this method in a financial analysis application in an optimized implementation. The system includes the software product along with databases storing the trading portfolio(s). Additionally, the method and product allow each candidate trade to be normalized with respect to selected criteria, so that a number of individual candidate trades may be ranked with respect to their incremental impact on the VaR measure to determine the candidate trade the best reduces the VaR measure.

33 Claims, 3 Drawing Sheets

SYSTEM AND METHOD FOR DETERMINATION OF INCREMENTAL VALUE AT RISK FOR SECURITIES TRADING

BACKGROUND

1. Field of Invention

The present invention relates generally to systems and methods for risk analysis in securities portfolios, and more particularly, to systems and methods for rapid or real time determination of Value at Risk metrics.

2. Background

Value-at-Risk (VaR) is a method for assessment of market-based financial risk in the trading of financial instruments. Given a trading portfolio of financial instruments, and description of the market variance characteristics, a VaR analysis statically determines how much of the value of the trading portfolio might be lost over a given period of time with a given level of probability. This determination is expressed as the "VaR" measure.

FIG. 1 is a data flow diagram of the conventional technique for determining the VaR of an existing trading portfolio. In a conventional VaR system, a trading portfolio P of financial instruments is decomposed into a series of component asset flows (known generically as "cashflows," even though the term "cash" sugguests a particular asset). This process is termed "shredding," and produces a set of cashflows that approximates the current value and risk behavior of the portfolio. The cashflows are then mapped onto a set of specified, benchmark cashflows made at specified future time intervals from the present. The future time intervals are known as "tenors" and the combination of an cashflow type (e.g., US dollars, Deutschemark, gold, and the like) and a tenor is termed a "vertex." The mapping is useful in order to provide a representation of the portfolio as a standardized collection of cashflows. The vertices onto which the cashflow set are mapped are those also used in a variance-covariance matrix Q of the market values of the benchmark cashflows. The covariance matrix Q describes the current market characteristics to a reasonable degree of detail. The shredding and mapping creates a set p of mapped cashflows from a portfolio P. These cashflows are then subjected to arithmetic operations with covariance matrix Q to produce the VaR measure.

For example, suppose that the trading portfolio includes financial instruments maturing in arbitrary number of days from the present, such as 22 days. The covariance matrix Q typically includes only vertices for other maturation periods of the given financial instrument, such as at 7, 30, and 60 days from the present. In order to reliably determine VaR in a conventional manner, the financial instrument is then mapped into selected cashflows at the vertices, for example, at either 7 or 30 days, or some distribution there between. There are a number of mapping and shredding functions available to create the set of mapped cashflows p, and the selection of such functions is not relevant to the present invention.

From the mapped cashflows, the VaR of the portfolio is determined by taking the square root of the product of the transpose p' of the set of mapped cashflows, the covariance matrix Q, and the original mapped cashflows p. The resulting VaR value specifies how much money a trader might lose in the current trading portfolio over a given interval of time, with a given probability.

For example, a financial instrument known as a "currency swap" may consist of the promise to pay certain amounts of Deutschemark in return for receiving certain amounts of U.S. dollars, at certain times. Shredding reduces the currency swap into some set of cashflows, being, for example, negative in sign for the Deutschemark flows, positive in sign for the U.S. dollar flows. These shredded cashflows are each scheduled to occur at some assigned point in time in the future, as determined by the swap contract itself. To measure the market risk of the swap, the market risk of a benchmark set of cashflows is determined, for example, for $1 received (or paid) today, in one week, in one month, in 3 months, 6 months, 1 year, and so forth, and similarly for 1 DM received (or paid) at the same tenors. The risks here are determined in part by the variances and covariances of all these quantities at the selected tenors, and in part by the amounts of such benchmark (vertex) cashflows (Risks are measured only at benchmark tenors because measuring variances and covariances for all possible cashflows at all possible arbitrary tenors would be computationally infeasible.) However, the shredded cashflows of the original swap contract do not necessarily lie exactly upon these vertices where the benchmark risks were measured. Therefore, the shredded cashflows are next "mapped" onto the vertices, in amounts that behave equivalently in terms of risk.

In the currency swap example, the set of shredded cashflows is mapped onto "equivalent-sized" cashflows lying at the vertices. As a final step, the risk of all mapped cashflows is calculated together using the known VaR equation, accounting for the risk offsets of low covariance. A more complete discussion of the VaR methodology may be found in *RiskMetrics Technical Document* (3rd Ed. 1995), the primary source on the method by J. P. Morgan, and in *An Introduction to VAR*, by C.ATS Software Inc. (Palo Alto, Calif.).

As currently used, the VaR only informs about the current risk characteristics for a given trading portfolio. A natural outgrowth of the calculation of VaR is the question "How can VaR be improved (decreased)?" There are several reasons that make this determination important. Among these, various regulatory and quasi-regulatory bodies (e.g. Bureau of International Settlements) have suggested that VaR should be tied to capital adequacy, i.e. the amount of capital which ought to be required to support certain types and amounts of trading. Thus, financial institutions desire to know the potential effects on VaR from possible trades, preferably in real time, in order to minimize the VaR for their trading portfolios.

Dealing with VaR on a real-time basis is a serious issue for most trading institutions. The typical financial institution may have tens of thousands of financial contracts ("trades"), and each trade gives rise to dozens of shredded cashflows. The number of cashflow vertices may also be as large as 300–1000 (since it represents the product of the number of markets times the number of tenors times the number of asset types). During a trading period, a single trader, perhaps one of hundreds of traders, or even thousands in an institution, may consider dozens of alternative trades during a trading day. It then becomes desirable for each trader to know which of his potential trades will improve (or reduce) the VaR measure for the entire financial institution's trading portfolio. That is, it is desirable to determine the incremental effect of each trade on the VaR measure of a trading portfolio.

In the current art, the only means of evaluating the incremental impact on the VaR of a new, candidate trade is to re-perform the entire VaR analysis on the combination of the existing trading portfolio and the candidate trade. This process is illustrated in FIG. 1, the dashed area, by repeating the VaR calculation for the candidate trade. More specifically, the re-determination of the VaR measure for an individual candidate trade $A_{(i)}$, is made by merging the candidate $A_{(i)}$ with the trading portfolio P, shredding and mapping the resulting combined portfolio, and recalculating the $VaR_{(i)}$ measure. The difference between the original VaR measure and the current $VaR_{(i)}$ measure is then taken. If the new $VaR_{(i)}$ measure is less than the original VaR measure, the candidate trade $A_{(i)}$ will improve the VaR of the trading portfolio. This existing art, however makes it extremely difficult to determine VaR in real time for each potential trade, due to the computationally-intensive nature of such VaR re-calculation.

Moreover, the VaR method is a one-directional calculation: much information is lost in the course of reducing a portfolio of trades into a single VaR number, and the process is not reversible. For example, many trades might give rise to a given pattern of mapped cashflows; many mapped cashflow patterns might give rise to a given VaR measure; and so on. There is really no direct means of recovering trade-related information from a final VaR measure. As a consequence, conventional systems provide no means of calculating from the VaR measure itself which trades should be done in order to improve the VaR measure, because the process if not reversible: one cannot recover cashflows from VaR numbers, nor trades from cashflows. In sum, the current VaR methodology, being unidirectional in its approach, cannot directly provide information in the opposite direction, that is, determine which trades will reduce the VaR measure.

Finally, VaR is a nonlinear risk measurement which depends not only upon the incremental trade, but also upon how this trade interacts and offsets with the existing portfolio of trades. This interdependence makes it quite difficult to establish the incremental effect of a new proposed trade, per se.

For these reasons, conventional VaR analysis is limited to at best repeatedly recalculating the VaR measure for the entire trading portfolio for every new candidate trade. The process is currently extremely time consuming, given, as noted above, the extremely large number of trades and cashflows that must be analyzed for each and every potential trade. The inability to recalculate VaR measure in real time seriously limits the potential feedback to individual traders and risk managers, who ideally should instead be provided instant response on whether their proposed trades are VaR-improving or not.

Accordingly, it is desirable to provide a system and method for determining incremental VaR measure for each candidate trade, without having to re-examine the institution's entire trading portfolio and recalculate the VaR measure on the combined trading portfolio. In addition, it is desirable to provide a system and method for determining a trade-independent means of comparing various candidate trades quickly and reliably, to identify a trade or trades that best reduce the VaR measure of a trading portfolio.

SUMMARY OF THE INVENTION

The present invention overcomes the limitations of the conventional VaR analysis systems by providing a system, method, and product with which any new proposed trade may be quickly examined for its incremental impact on the VaR measure of the trading portfolio, without further reference to the existing portfolio held by the institution, and without the need to re-determine the combined portfolio's VaR measure for each candidate trade. In addition, the present invention allows a set of candidate trades to be evaluated and ranked to identify the trade(s) that most favorably reduce the VaR measure.

In one aspect the present invention is a financial analysis application, a software product, that operates with conventional computerized financial trading systems. The financial analysis application analyzes a trading portfolio of financial instruments stored in a database or other storage mechanism to produce a VaR measure for the trading portfolio. An improved method is employed that determines not just the VaR measure for the trading portfolio, but further, a vector of intermediate data values here called the "DELVAR." The DELVAR vector is then employed in forming approximations of the rate of change in the VaR measure of a trading portfolio, for any subsequent trade. The financial analysis software need only determine the DELVAR vector once for a given trading portfolio within a selected trading period, such as a single day. With the DELVAR vector, the impact, or incremental VaR of any candidate trade in the trading period may be determined without the computationally expensive process of re-determining the VaR measure for each combination of the existing portfolio and a candidate trade, as in conventional systems.

Accordingly, in this aspect of the invention, a list of candidate trades is provided to the financial analysis application, and each is individually assessed for its impact on the VaR by applying the candidate trade to the DELVAR. The software does this by conventional shredding and mapping each candidate trade to produce a set of mapped cashflows for the trade, typically represented as a vector quantity; the cashflow vector for a candidate trade is then combined with the DELVAR vector to produce an approximate incremental impact value for the candidate trade.

The DELVAR vector may be computed quite efficiently, using conventional data processing operations. Once the DELVAR vector is determined, an incremental VaR impact value can be computed, which shows whether the VaR for the trading portfolio will change positively or negatively by the addition of the candidate trade to the portfolio of trades. This permits, among its other uses, an incremental analysis of a trader's next proposed trade, without re-examining the institution's entire portfolio.

As a further improvement provided by the present invention, the cashflows of each candidate trade may normalized prior to application to the DELVAR with respect to a given criteria function. Normalization allows any number of candidate trades, even of different types, to be compared according to their incremental VaR impact values. As a result, candidate trades that best reduce the VaR measure of a trading portfolio may be selected and executed, thereby desirably, and expediently reducing the risk of a trading portfolio. Normalization is provided by additional normalization components in the financial analysis application, and by the methods such components employ.

DETAILED DESCRIPTION OF THE INVENTION

Figure 1:
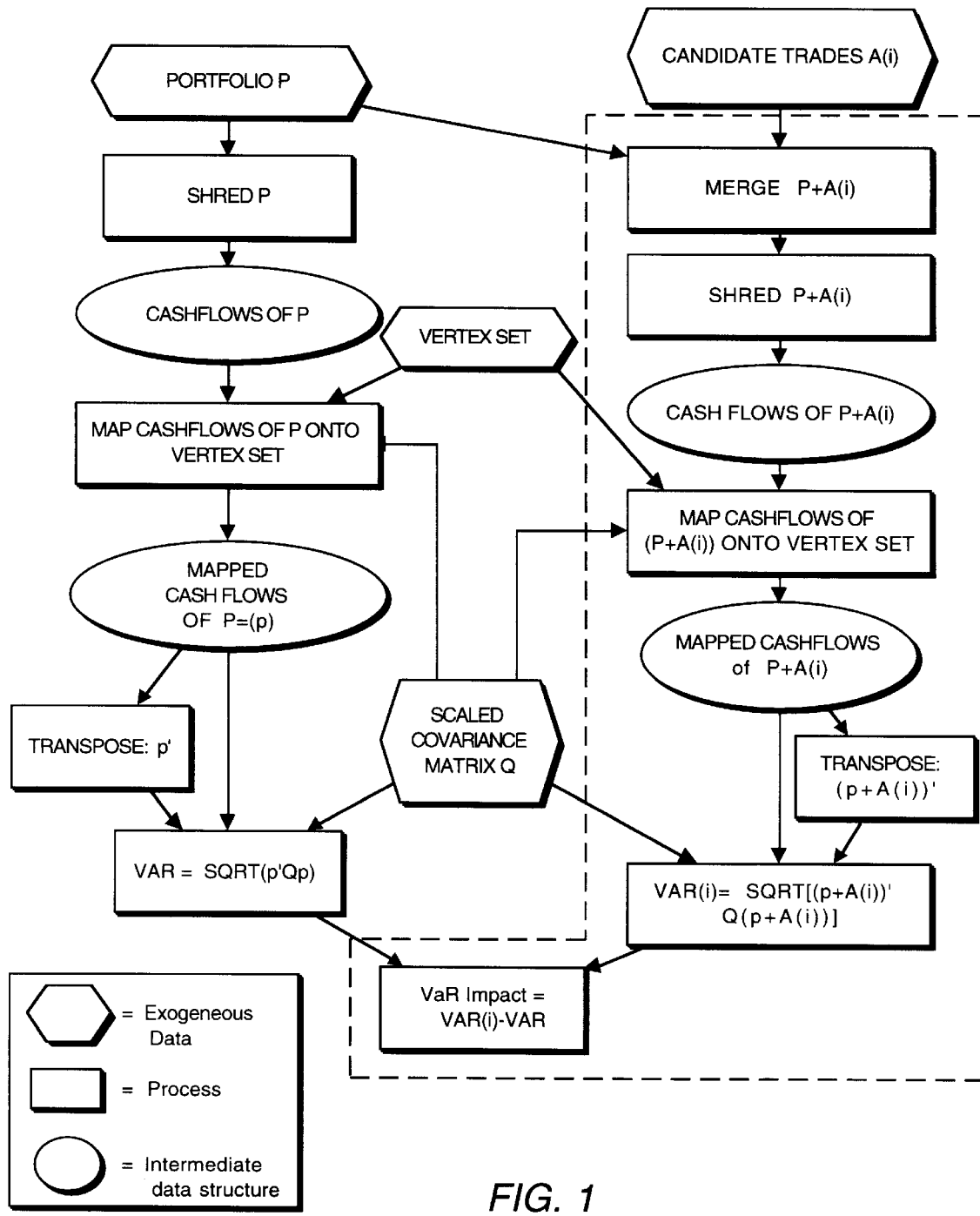
FIG. 1 is an illustration of the dataflow for a conventional method of determining VaR for a trading portfolio.
Figure 2:
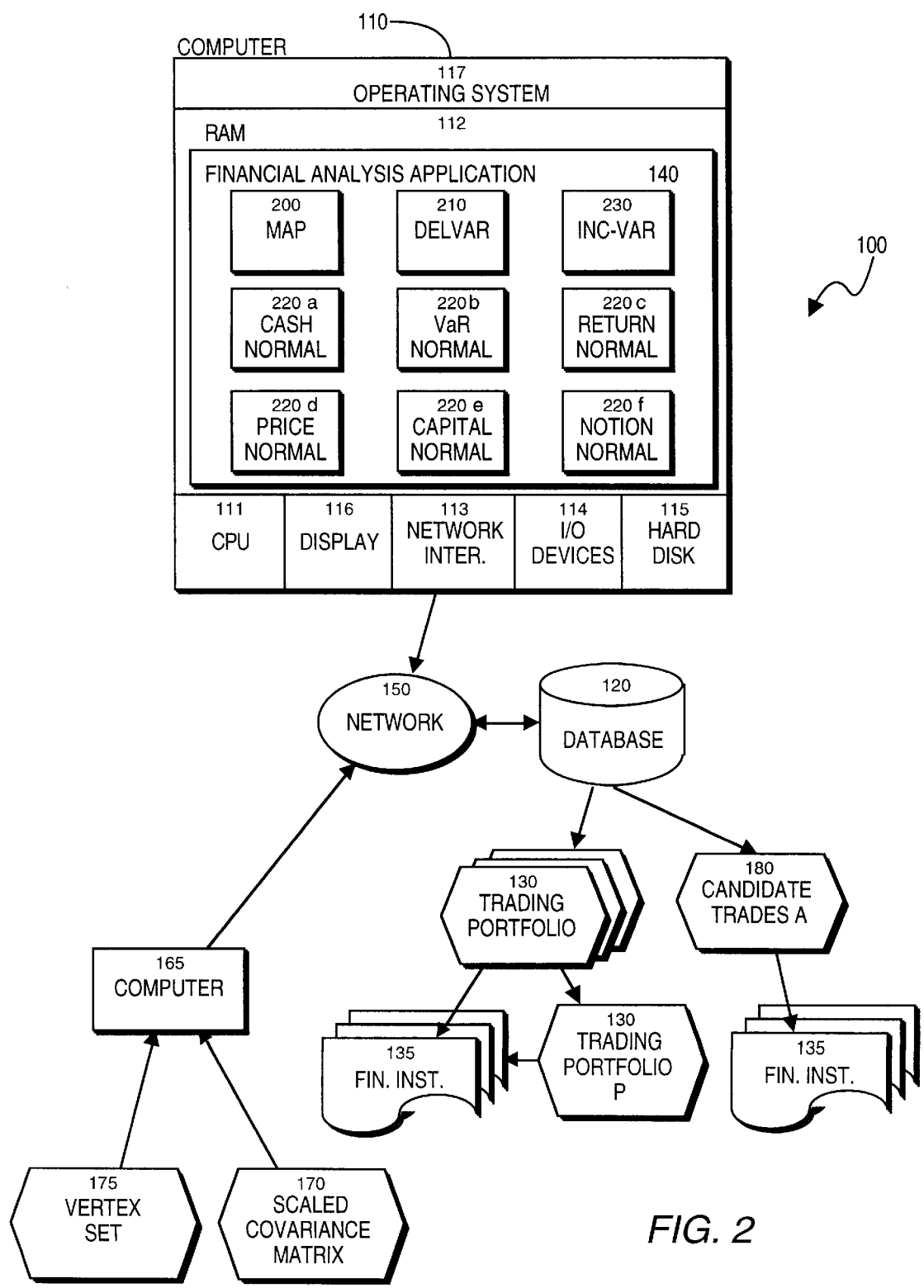
FIG. 2 is an illustration one embodiment of a financial analysis system in accordance with present invention.

Referring now to FIG. 2, there is shown an illustration of a financial analysis system 100 operating in accordance with one embodiment of the present invention. The system 100 includes a computer 110 coupled to a database 120 via a network 150. The computer 110 is of conventional design, and includes a processor 111, randomly addressable memory (RAM) 112, network interface 113, input and output devices 114, hard disk 115, and a display 116. The computer 110 executes a conventional operating system 117. In a preferred embodiment, the computer is an Intel-compatible personal computer operating Microsoft's Windows™ operating system. Other computers and operating systems may also be used.

The computer 110 interfaces with the database 120 on a mass storage device in a conventional manner, to store and retrieve data therefrom. The database 120 stores at least one trading portfolio 130. A trading portfolio 130 is comprised of a set of financial instruments 135 or trades, or other trading portfolios 130. For each financial instrument 135, appropriate data identifying the type, amount, and realization dates, and other attributes of the instrument, along with some means for associating the financial instrument with its trading portfolio 130. In a preferred embodiment, the database 120 is relational. In addition, the database 120 preferably maintains as one of its tables (or other useful data structure) a list of the types of financial instruments 135 used in the portfolios 130, along with a nominal (e.g. $1) amount for the instrument.

In a preferred embodiment, the computer 110 interfaces with a network 150 to communicate with remote other computer systems, and receive from at least one such computer 165 a computer readable dataset comprising a covariance matrix 170 for selected ones of the types of financial instruments 135 stored in the database 120, and a vertex set 175. The covariance matrix 170 and vertex set 175 is then stored in the database 120 or used directly in the RAM 112. The covariance matrix 170 defines the covariance values for the selected financial instruments 135 at predetermined tenors, in the manner described above. The vertex set 175 defines vertices for the tenors in the covariance matrix 170. In one preferred embodiment, the covariance matrix 170 is received and updated to the database 120 on a daily basis. One source of the covariance matrix 170 and vertex set 175 is J. P. Morgan's RiskMetrics™ dataset, available daily on the World Wide Web at:

http://www.jpmorgan/RiskMetrics/DOWNLOADING/download-data.html.

Alternatively, the covariance matrix 170 and vertex set 175 may be locally generated.

The database 120 stores user inputs, such as from a trader, of a set 180 of candidate trades 180 of selected financial instruments 135 (the set may include a single candidate trade 180. The manner in which the set of candidate trades 180 is generated is determined by the user of the system 100, and is not restricted by the present invention, which may operate upon any set of candidate trades 180. For each of candidate trades 180 in the set, the system 100 will determine its incremental impact on a VaR of a trading portfolio 130. Optionally, the system 100 may determine from among the set the candidate trades 180 that best improves the VaR of a trading portfolio 130.

The computer 110 stores and executes a financial analysis application 140. The financial analysis application 140 is a software product that operates in accordance with the present invention. The financial analysis application 140 reads and manipulates data regarding a trading portfolio 130 from the database 120 in accordance with the present invention to produce both a DELVAR value for a trading portfolio 130 and an incremental VaR impact value for any candidate trade. The financial analysis application 140 includes a shred/map ("MAP") module 200, a DELVAR module 210, a set of normalization modules 220, and an incremental VaR module 230. While one computer 110 is shown with the financial analysis application 140, additional computers 110 may also be used, each executing directly, or via a client-server relationship, a financial analysis application 140 as described herein.

Figure 3:
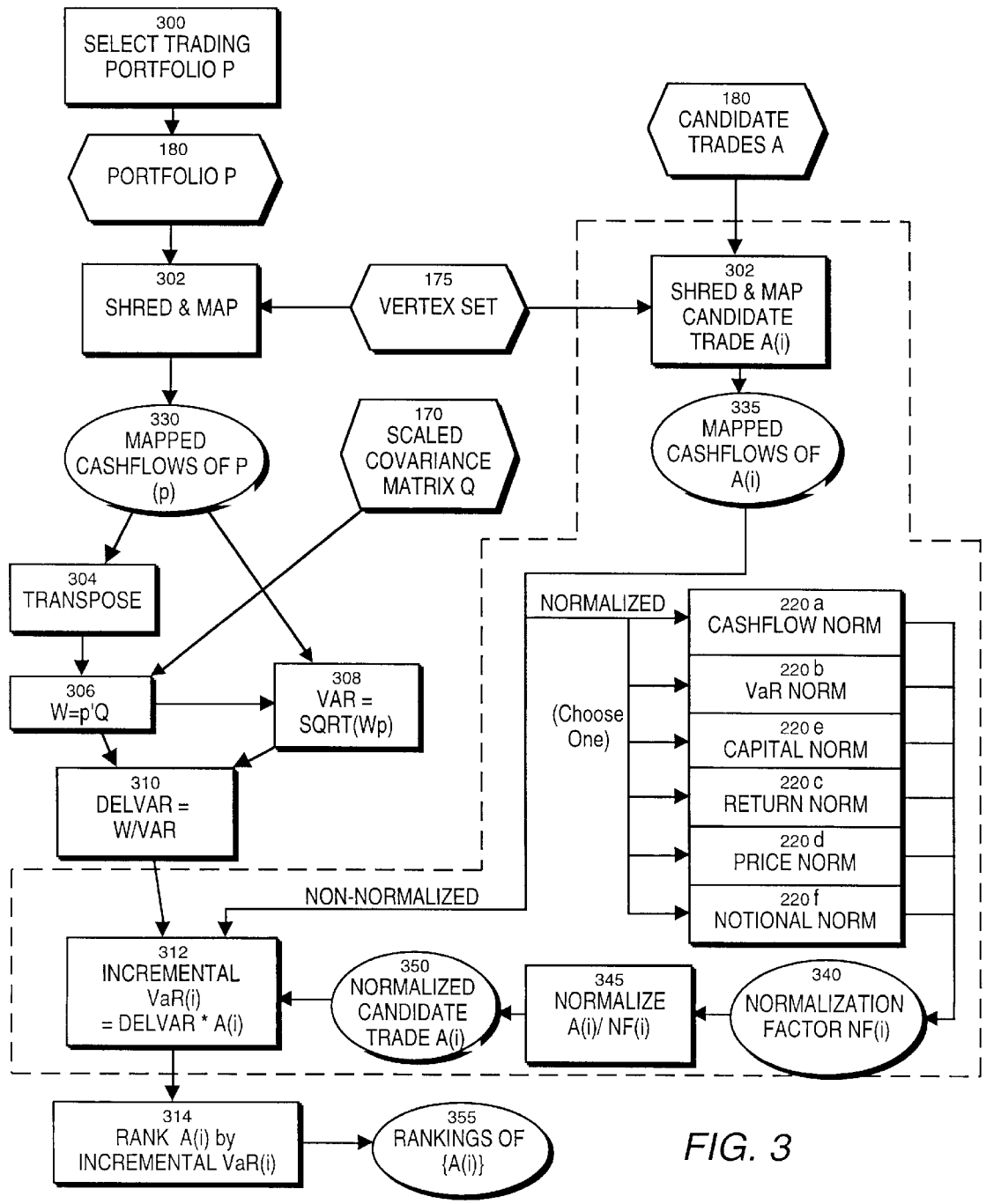
FIG. 3 is an illustration of one embodiment of the dataflow of the financial analysis system of the present invention.

Referring now to FIG. 3, there is shown a dataflow diagram of the operation of the financial analysis application 140 in accordance with one embodiment of the present invention. First, the VaR value for any number or collection of trading portfolios 130 is determined. A trader, risk manager, or officer selects 300 a trading portfolio 130 for analysis. As a trading portfolio 130 may contain other trading portfolios 130, including the overall position of an institution, the VaR of any aggregation of financial instruments 135 may be determined. Preferably, the VaR for a trading portfolio 130 is done overnight during the non-trading hours, due the time required. It is also preferred that VaR of the trading portfolio 130 for the entire financial institution be determined.

The financial analysis application 140 reads the selected trading portfolio 130 and applies 302 the shred and map functions 200 thereto. These may include any conventional shredding function to produce a set of cashflows for the trading portfolio 135. The financial analysis application 140 reads the covariance matrix 170 and the vertex set 175, and maps each of the cashflows onto a vertex therein according to a predetermined, or user selected mapping function provided by the map module 200. Any variety of shredding or mapping functions may be employed with the system of the present invention. The result of the shred and map module 200 is a set of mapped cashflows 330 for the trading portfolio 130. The mapped cashflows 330 may be characterized as a column vector, in which each vector component is a cashflow. For later convenience in notation, the mapped cashflows 330 are also designated p.

Using the mapped cashflows 330, the VaR measure for the selected trading portfolio 130, and along with the DELVAR vector, are determined by the DELVAR module 210. Unlike conventional VaR systems, the DELVAR module 210 determines the VaR measure in a manner that is optimized for the determination of the DELVAR vector. In one implementation of the DELVAR module 210, operating as illustrated in FIG. 3, an intermediate product W is taken 306 as the vector sum of the transpose p' (304) of the mapped cashflows 330 of the trading portfolio 130. The VaR measure for the selected trading portfolio 130 is then determined 308 as the square root of the inner product of W and p. This VaR determination is only made once for the trading portfolio 130 in a selected time interval, like a trading day or say, 3-hour period. The DELVAR vector is then determined 310 as the quotient of the intermediate quantity W, and the VaR measure, again, only once during the selected trading interval.

The DELVAR module 210 is efficiently implemented by calculating the vector product W of the mapped cashflows 330 and the covariance matrix 170 and storing it as an intermediate step to determining the VaR measure for the trading portfolio 130. The following pseudo-code is an example:

```
SUBROUTINE DELVAR (P, Q, NUM_VERTICES)
{
    FOR I = 1 TO NUM_VERTICES {
        W[I] = 0
        FOR J = 1 TO NUM_VERTICES {
            W[I] = W[I] + P[J] * Q[J,I]
        }
    }
    VAR = SQRT(INNERPROD(W, P, NUM_VERTICES))
    FOR I = 1 TO NUM_VERTICES {
        DELVAR[I] = W[I]/VAR
    }
}
```

Here, P is the mapped cashflow 330, Q is the scaled covariance matrix 170, NUM_VERTICES is provided by the vertex set 175, and INNERPROD0 () is a standard calculation of the inner product of two vectors of compatible size. By first determining the row vector W, it is possible to determine DELVAR. It is important to note the DELVAR here was determined without any reference to any candidate trade.

Conventional approaches to VaR, in order to reduce the run time required, do not separately determine W. As a result, conventional VaR calculations requires approximately $N^2$ steps (where N is shorthand for NUM_VERTICES) and no additional memory, while the DELVAR module 220 requires approximately $N^2+N$ steps and memory for the N real number of additional memory. However, the gain for these minor costs is the ability to recalculate the incremental VaR impact value multiple times with minimal cost in time, as described below.

The DELVAR module 210 as described is one implementation for determining DELVAR. It is based on the following analysis of VAR.

Mathematically, VaR may be defined as follows:

$$VaR = \sqrt{p'Qp} \qquad \text{Eq. 1}$$

where:

P is a selected trading portfolio 130 of financial instruments 135 as described;

p=m (P) is a vector (column) of mapped cashflows 330, where m () is a mapping and shredding function provided by the map module 200 on the vertex set 175;

p' is the transpose of p;

Q is the covariance matrix 170 scaled by the square of the VaR probability standard deviations (which is typically $1.65^2$), the indices of the matrix also being the vertex set 175.

Assume that a candidate trade $A_{(i)}$ from the set of candidate trades 180 is to be made, and it is desired to determine the impact on the known VaR measure. The shredded and mapped cashflows of the candidate trade may be considered a vector $a_i$, which is then scaled by the small positive quantity $\epsilon$. As described above, a conventional approach determining the impact of this candidate trade $A_{(i)}$ on the VaR would be to shred and map candidate trade $A_{(i)}$ in the trading portfolio 130 to produce a revised map cashflow set $r_i$. VaR would conventionally be recalculated as, where $$w_i(\epsilon) = \sqrt{r_i'(\epsilon)Qr_i(\epsilon)} \qquad \text{Eq. 2}$$

where $r_i = p + \epsilon a_i$. But a Taylor series expansion of VaR around $\epsilon=0$ produces:

$$w_i(\epsilon) = w_i(0) + \epsilon \nabla w_i(0) \cdot a_i + o(\epsilon^2) \qquad \text{Eq. 3}$$

$$= v + \epsilon(\text{DELVAR} \cdot a_i) + o(\epsilon^2) \qquad \text{Eq. 4}$$

where $\nabla$ refers to the vector derivative operator, and where the vector index is the vertex set 175. The first term $w_i(0)$ is merely the original VaR. In Eq. 4, if $\epsilon$ is sufficiently small (and positive, since the candidate trade $a_i$ is being added in positive amount to the trading portfolio 130), then the improvement in the VaR measure is governed by the sign and magnitude of the second term of the Eq. 4. The higher order term ($o(\epsilon^2)$) may be reasonably ignored, since $\epsilon$ is small. It is of course the case that most notational amounts of candidate trades 180 in an institution will be small relative to the size of the entire trading portfolio 130, justifying the approximation.

Direct calculation shows that:

$$DELVAR = \frac{\nabla w_i(0)}{w_i(0)} = \frac{\nabla v}{v} \, p'Q/v, \qquad \text{Eq. 5}$$

Thus, the DELVAR vector depends only upon the selected trading portfolio 130, and not upon the selection of candidate trade $A_{(i)}$ from the set of candidate trades 180, even though the candidate trade $A_{(i)}$ was included in the conventional approach to the incremental determination. Thus, the same DELVAR vector works for all candidate trades 180, and does not itself have to be calculated more than once for the selected trading portfolio 180.

Returning then to FIG. 3, the incremental VaR impact value of each candidate trade 180 from the set of candidate trades is determined as follows:

The candidate trade 180 is shredded and mapped by the map module 200 on the vertex set 175 to produce its corresponding mapped cashflows 335. The mapped cashflows 335 are then optionally normalized by one of the normalization modules 220, as further described below. Whether or not the candidate trade 180 is normalized, the incremental VaR module 230 takes 312 the inner product of the mapped cashflows 335 and the DELVAR vector to produce the incremental VaR impact value. This determination of the incremental VaR impact value does not require recalculation of the VaR measure for the entire trading portfolio 130 as in conventional systems.

The incremental VaR impact value as described is useful for its sign value. If the incremental VaR impact value is negative, then the candidate trade 180 improves the VaR, and is thus a risk-reducing trade. If the sign is positive, the candidate trade 180 degrades the VaR by increasing portfolio risk. In this manner then, the trader can immediately determine, for each and every candidate trade 180 whether the trade is beneficial to the institution for risk reduction purposes.

This determination of the incremental impact on VaR of a candidate trade 180 may be expressed, in light of the foregoing, as:

$$[p'Q/v] \cdot a_i \qquad \text{Eq. 6}$$

The incremental VaR impact value as calculated via the DELVAR vector is an approximation, due to ignoring the higher order terms. However, because the typical trading portfolio 130 is large relative to the candidate trade 180, the incremental VaR impact value measured via the DELVAR vector is sufficiently quite accurate in most cases to provide the desired information for risk management.

The execution time of this inner product determination by the incremental VaR module 230 varies linearly with the number of vertices in the vertex set 175. The fact that the DELVAR vector is fixed for a selected trading portfolio 130 makes this linear computation time feasible, and is therefore a feature which provides a fast, incremental VaR calculation. This makes the financial analysis application 140 and the system 110 suitable for a real-time trading environment, even though it is an approximation to the true incremental VaR measure.

One benefit of the above approach and the determination of DELVAR vector for a trading portfolio 130 is the rapid identification, by the incremental VaR impact value, of those candidate trades which reduce or increase the VaR. However, because only the sign of the incremental VaR impact value resulting from a candidate trade 180 might be ascertained, this approach alone does not provide means for comparing the relative worthiness of each of candidate trades 180. This is because any single candidate trade 180 may be arbitrarily doubled or halved in size, so that comparisons of magnitude of the incremental VaR impact value for different candidate trades 180 are meaningless. To accomplish comparability in risk, which is a goal of risk management, it is first desirable to assure that the candidate trades 180 are scaled in such a fashion as to become comparable with respect to a selected criterion. This step is termed herein "normalization". In one embodiment of the present invention, normalization is provided by selected one of the normalization modules 220.

In one embodiment of the present invention, there are six normalization modules 220, each providing a distinct criteria for comparing the incremental VaR impact value of candidate trades 180: cashflow normalization 220*a*, VaR normalization 220*b*, return normalization 220*c*, price normalization 220*d*, capital normalization 220*e*, and notional normalization 220*f*. Each normalization module 220 produces a normalization factor $\lambda_i$ calculated in a manner (detailed below) depending upon the candidate trade 180 being normalized. Reference is now made to FIG. 3, where calculation of the normalization factor 340 (notated "NF(i)" in FIG. 3) proceeds via one of several alternative methods:

1. Cashflow normalization 220*a*. In this module, a mathematical norm for the mapped cashflow 335 is associated with each candidate trade 180. If candidate trade $a_i$ consists of a vector of cashflows $a_i=(a_{i1}, a_{i2}, \ldots, a_{in})$ then the normalization factor $\lambda_i$ (340) may be selected as one of:

$$\lambda_i = \|a_i\| = \sqrt{\sum_j c_j a_{ij}^2} \qquad \text{Eq. 7}$$

$$\lambda_i = \|a_i\| = \sum_j c_j |a_{ij}| \qquad \text{Eq. 8}$$

$$\lambda_i = \|a_i\| = \max_j \{c_j |a_{ij}|\}. \qquad \text{Eq. 9}$$

where Eq. 7 normalizes the cashflow vector length, Eq. 8 uses the sum of the trade's absolute cashflows, and Eq. 9 employs the largest individual cashflow component. All of these may be further extended to an arbitrary positive weighting of the cashflows prior to normalization factor calculation, as shown by the weightings $\{c_j\}$ above.

2. VaR normalization 220*b*. In this module, the normalization is performed according to the VaR inherent in the candidate trade 180 itself. In effect, each candidate trade 180 is evaluated on the basis of equating the risk, measured via overall VaR measure, as if each candidate trade 180 were held in isolation. Accordingly, the normalization factor $\lambda_i$ (340) is calculated as $$\lambda_i \equiv_i \sqrt{a'_i Q a_i} \qquad \text{Eq. 10}$$

where Q is the covariance matrix 170.

3. Return normalization 220*c*. In this module, the normalization factor $\lambda_i$ (340) is selected according to the value of anticipated future returns accruing to holding the candidate trade 180. In one embodiment, this is determined by taking the net present value of all future revenues and payments of the candidate trade 180, as one such measure of future returns.

4. Price normalization 220*d*. In this module, the normalization factor $\lambda_i$ (340) is set equal to the market price of the candidate trade 180. This equates each candidate trade 180 according to their current mark-to-market, i.e., the value of the candidate trade 180 by present market standards.

5. Capital normalization 220*e*. In this module, the normalization factor $\lambda_i$ (340) is set equal to the regulatory or other amount of capital which must be allocated to sustain the candidate trade 180. For example, the Bureau of International Settlements (BIS) guidelines provide formulas involving certain capital adequacy underlying certain trade types.

6. Notional normalization 220*f*. In this module, a "notional value," of the candidate trade 180 is used, the notional value being an otherwise arbitrary market or other convention on the number of units involved in the candidate trade 180. For example, currency swap contracts are typically denominated in amounts involving $1 of principal payment, regardless of the swap interest rates involved. Because this normalization factor $\lambda_i$ (340) is completely arbitrary, it serves as a catch-all category of normalization, and may be used with any type of financial instrument 135.

For any of the normalization modules 220, then, the candidate trade cashflow vector 335 $a_i$ is normalized 345 as:

$$a_i = [a_i/\lambda_i] \qquad \text{Eq. 11}$$

The normalization modules 220 thus described may be implemented, in one embodiment, using pseudo-code such as:

```
SUBROUTINE NORMALIZE(A)
{
    FOR I = 1 TO NUM_CANDIDATES {
        LAMBDA = NORM(A, I, NUM_VERTICES)
        FOR J = 1 TO NUM_VERTICES DO {
            A[I,J] = A[I,J] / LAMBDA
        }
    }
}
``` where the procedure NORM provides one of the six normalization factors 340 described above.

Accordingly, each of the candidate trades 180 is normalized 345 with one of the normalization modules 220 to produce for each candidate trade a normalized cashflow vector 350. This normalized cashflow 350 is then input into the incremental VaR module 230, and the incremental VaR impact value, VaR$_{(i)}$ for that candidate trade A$_{(i)}$ is determined 312, and stored.

Once all of the candidate trades 180 have been processed, and an incremental VaR impact value determined for each, these normalized candidate trades 350 are ranked 314 by their now-comparable incremental VaR impact value to produce a ranked set 355 of candidate trades. The trader risk manager, or officer can then review the ranked set 355 and select the candidate trade that best improves the VaR measure, in other words, the candidate trade that best reduces the value at risk for comparable values of the normalization. Preferably every such person is able to use the financial analysis application 140 for evaluating each candidate trade 180 throughout the trading period. This is done, as shown above, without having to recalculate the VaR measure for the trading portfolio 130 each time.

In summary, the present invention provides a system, a method, and a software product that beneficially determines the change in the VaR measure of a trading portfolio for any potential candidate trade that may be made and added to the portfolio. In addition, the present invention allows any variety of candidate trades to be compared for their impact on the VaR measure, thereby allowing a trader specifically, and a financial institution more generally, to identify and select those candidate trades that best reduce the VaR measure, and thereby improve the financial performance of the trading portfolio.

I claim:

1. A computer readable memory storing thereon a computer program for controlling the execution of a processor to determine whether any candidate trade in a selected trading interval reduces a value at risk measure of a trading portfolio having a selected financial instruments, the computer program controlling the processor to:

determine the value at risk measure for the trading portfolio once with respect to the trading interval;

determine a derivative vector of the value at risk measure;

determine a set of cashflows for the candidate trade;

determine an incremental value at risk measure for a candidate trade from the derivative vector of the value at risk measure and the set of cashflows for the candidate trade; and, determine from the sign of the incremental value at risk measure whether the value at risk measure of the trading portfolio is reduced by the candidate trade.

2. The computer readable memory of claim 1, wherein to determine the derivative vector of the value at risk measure for the trading portfolio, the computer program thereon controls the processor to:

convert the financial instruments in the trading portfolio into a first set of cashflows;

map the first set of cashflows unto a set of selected tenors;

determine a vector product W of transposed mapped cashflows and a scaled variance-covariance matrix of risk variances for the financial instruments in the trading portfolio at the selected tenors;

determine the value at risk measure from the square root of the inner product of W and the variance-covariance matrix; and, determine the derivative vector from the quotient of W and the value at risk measure.

3. The computer readable memory of claim 2, wherein the computer program thereon controls the processor to:

receive a plurality of candidate trades, each candidate trade including of at least one financial instrument;

for each candidate trade:

convert the candidate trade into a second set of cashflows;

map the second set of cashflows unto the set of selected tenors;

normalize the mapped second set of cashflows for the candidate trade by a normalization factor;

determine an incremental value at risk measure from the derivative vector and the mapped second set of cashflows for the candidate trade; and, rank each candidate trade by its incremental value at risk measure.

4. The computer readable memory of claim 3, wherein the normalization factor is:

a value at risk normalization factor determined according to the equation:

$$\lambda_i \equiv_i \sqrt{a'_i Q a_i}$$

where $\lambda_i$ is the value at risk normalization factor, and $a_i$ is the second set of cashflows.

5. The computer readable memory of claim 3, wherein the normalization factor is:

a return normalization factor equal to the value of the anticipated future returns of the candidate trade.

6. The computer readable memory of claim 3, wherein the normalization factor is:

a capital normalization factor equal to an amount of capital required sustain the candidate trade.

7. The computer readable memory of claim 3, wherein the normalization factor is:

a price normalization factor equal to a market price of the candidate trade.

8. The computer readable memory of claim 3, wherein the normalization factor is:

a notional normalization factor equal to a predetermined number of units for the candidate trade selected according to the type of the candidate trade.

9. The computer readable memory of claim 3, wherein the normalization factor is:

a cashflow normalization factor determined according to the equation:

$$\lambda_i = \|a_i\| = \sqrt{\sum_j c_j a_{ij}^2}$$

where $\lambda_i$ is the cashflow normalization factor, and $a_i$ is the second set of cashflows, and $\{c_j\}$ is an arbitrary set of positive weights.

10. The computer readable memory of claim 3, wherein the normalization factor is:

a cashflow normalization factor determined according to the equation:

$$\lambda_i = \|a_i\| = \sum_j c_j |a_{ij}|$$

where $\lambda_i$ is the cashflow normalization factor, $a_i$ is the second set of cashflows, and $\{c_j\}$ is an arbitrary set of positive weights.

11. The computer readable memory of claim 3, wherein the normalization factor is:

a cashflow normalization factor determined according to the equation:

$$\lambda_i = \|a_i\| = \max_j \{c_j |a_{ij}|\}$$

where $\lambda_i$ is the cashflow normalization factor, $a_i$ is the second set of cashflows, and $\{c_j\}$ is an arbitrary set of positive weights.

12. The computer readable memory of claim 2 wherein the computer program thereon controls the processor to:

receive at least one candidate trade of at least one financial instrument;

convert the candidate trade into a second set of cashflows;

map the second set of cashflows unto the set of selected tenors; and, determine an incremental value at risk measure as the product of the derivative vector and the mapped second set of cashflows.

13. The computer readable memory of claim 2, wherein the computer program stored thereon controls the processor to:

determine the vector product W of transposed mapped cashflows p and the selected variance-covariance matrix Q according to the equation:

$$W = p'Q;$$

determine the value at risk measure, VaR, according to the equation:

$$VaR = Wp;$$

prior to determining the derivative vector, DELVAR, according to the equation:

$$DELVAR = W/Var.$$

14. The computer readable memory of claim 1, wherein to determine the incremental value at risk for the selected set of candidate trades, the computer program thereon controls the processor to:

determine an incremental value at risk for each candidate trade in the selected set of candidate trades from the derivative vector and the set of cashflows for the candidate trade; and accumulate the incremental value at risk for all of the candidate trades.

15. A computer readable memory storing thereon a computer program for controlling the execution of a processor to determine an incremental impact of a candidate trade on a value at risk measure of a trading portfolio P having selected financial instruments, the computer program controlling the processor to:

determine the value at risk measure VaR once for the trading portfolio for a selected trading interval;

determine the derivative vector of the value at risk measure VaR once for the trading portfolio for the selected trading interval;

determine a set of cashflows for the candidate trade;

determine the incremental impact of the candidate trade on the value at risk measure VaR from the product of the derivative vector and the set of cashflows for the candidate trade.

16. The computer readable memory of claim 15, coupled to an article of manufacture including:

a storage device storing at least one trading portfolio comprised of a plurality of financial instruments, and a selected scaled variance-covariance matrix Q of market risk variances for a plurality of financial instruments including the selected financial instruments, the market risk variances determined with respect to a set of selected tenors;

a processor coupled to the storage device, and controlled by the computer program stored in the memory to determine the value at risk measure VaR once for the trading portfolio for the selected trading interval by:

converting the financial instruments in the selected trading portfolio into a first set of cashflows;

mapping the first set of cashflows unto the set of selected tenors;

determining a vector product W of transposed mapped cashflows and the selected variance-covariance matrix; and, determining the value at risk measure VaR from as square root of the inner product of the mapped cashflows and the vector product W.

17. The computer readable memory of claim 16, wherein the computer program stored thereon controls the processor to determine the derivative vector of the value at risk measure VaR as the quotient of the vector product W divided by the value at risk measure VaR.

18. The computer readable memory of claim 15, the computer program stored thereon controlling the processor to:

receive a selected plurality of candidate trades; for each candidate trade:

determine a set of cashflows for the candidate trade;

normalize the set of cashflows by a normalization factor;

determine for the candidate trade an incremental impact value on the value at risk measure VaR from the product of the derivative vector and the normalized set of cashflows of the candidate trade; and, rank the selected plurality of candidate trades by the incremental impact values.

19. A computer implemented method of determining whether any candidate trade in a selected trading interval reduces a value at risk measure of a trading portfolio, comprising:

determining the value at risk measure for the trading portfolio once with respect to the trading interval;

determining a derivative vector of the value at risk measure;

determining a set of cashflows for the candidate trade;

determining an incremental value at risk for a candidate trade from the derivative vector and the set of cashflows for the candidate trade; and, determining from the sign of the incremental value at risk whether the candidate trade reduces the value at risk measure of the trading portfolio.

20. The computer implemented method of claim 19, further comprising:

receiving a plurality of candidate trades, each candidate trade including of at least one financial instrument; for each candidate trade:

normalizing the candidate trade by a normalization factor;

determining an incremental value at risk from the derivative vector and the normalized candidate trade; and, ranking each candidate trade by its incremental value at risk to determine at least one of the candidate trades that most reduce the value at risk measure of the trading portfolio.

21. The computer implemented method of claim 20, further comprising for each candidate trade:

converting the candidate trade into a second set of cashflows;

mapping the second set of cashflows unto the set of selected tenors;

normalizing the mapped second set of cashflows for the candidate trade by the normalization factor; and, determining an incremental value at risk from the derivative vector and the mapped second set of cashflows for the candidate trade.

22. The computer implemented method of claim 20, wherein the normalization factor is:

a value at risk normalization factor determined according to the equation:

$$\lambda_i \equiv_i \sqrt{a'_i Q a_i}$$

where $\lambda_i$ is the value at risk normalization factor, and $a_i$ is the second set of cashflows.

23. The computer implemented method of claim 20, wherein the normalization factor is:

a return normalization factor equal to the value of the anticipated future returns of the candidate trade.

24. The computer implemented method of claim 20, wherein the normalization factor is:

a capital normalization factor equal to an amount of capital required sustain the candidate trade.

25. The computer implemented method of claim 20, wherein the normalization factor is:

a price normalization factor equal to a market price of the candidate trade.

26. The computer implemented method of claim 20, wherein the normalization factor is:

a notional normalization factor equal to a predetermined number of units for the candidate trade selected according to the type of the candidate trade.

27. The computer implemented method of claim 20, wherein the normalization factor is:

a cashflow normalization factor determined according to the equation:

$$\lambda_i = \|a_i\| = \sqrt{\sum_j c_j a_{ij}^2}$$

where $\lambda_i$ is the cashflow normalization factor, $a_i$ is the second set of cashflows, and $\{c_j\}$ is an arbitrary set of positive weights.

28. The computer implemented method of claim 20, wherein the normalization factor is:

a cashflow normalization factor determined according to the equation:

$$\lambda_i = \|a_i\| = \Sigma c_j |a_{ij}|$$

where $\lambda_i$ is the cashflow normalization factor, $a_i$ is the second set of cashflows, and $\{c_j\}$ is an arbitrary set of positive weights.

29. The computer implemented method of claim 20, wherein the normalization factor is:

a cashflow normalization factor determined according to the equation:

$$\lambda_i = \|a_i\| = \max_j \{c_j |a_{ij}|\}$$

where $\lambda_i$ is the cashflow normalization factor, $a_i$ is the second set of cashflows, and $\{c_j\}$ is an arbitrary set of positive weights.

30. The computer implemented method of claim 19, wherein determining the value at risk measure comprises:

receiving a scaled variance-covariance matrix of market risk variances for a plurality of financial instruments including selected financial instruments in the trading portfolio, the market risk variances determined with respect to a set of selected tenors;

converting the financial instruments in the trading portfolio into a first set of cashflows;

mapping the first set of cashflows unto the set of selected tenors;

determining a vector product W of transposed mapped cashflows and the selected variance-covariance matrix; and determining the value at risk measure from the mapped cashflows and the vector product W.

31. A computer implemented method of determining an incremental value at risk for a selected set of candidate trades in a trading portfolio during a selected trading interval, comprising:

determining a value at risk measure for the trading portfolio once with respect to the trading interval;

determining a derivative vector of the value at risk measure;

determining a set of cashflows for the selected set of candidate trades;

determining the incremental value at risk for the selected set of candidate trades from the derivative vector and the set of cashflows for the selected set of candidate trades.

32. The method of claim 31, wherein determining the incremental value at risk for the selected set of candidate trades further comprises:

determining an incremental value at risk for each candidate trade in the selected set of candidate trades from the derivative vector and the set of cashflows for the candidate trade; and accumulating the incremental value at risk for all of the candidate trades.

33. A computer readable memory storing thereon a computer program for controlling the execution of a processor to determine an incremental value at risk for a selected set of candidate trades in a trading portfolio during a selected trading interval, the computer program controlling the processor to:

determine a value at risk measure for the trading portfolio once with respect to the trading interval;

determine a derivative vector of the value at risk measure;

determine a set of cashflows for the selected set of candidate trades;

determine the incremental value at risk for the selected set of candidate trades from the derivative vector and the set of cashflows for the selected set of candidate trades.

\* \* \* \* \*

UNITED STATES PATENT AND TRADEMARK OFFICE
CERTIFICATE OF CORRECTION

PATENT NO.:   5,819,237

DATED:        October 6, 1998

INVENTOR:     Mark B. Garman

It is certified that errors appear in the above-identified patent and that said Letters Patent is hereby corrected as shown below:

```
Column 13, line 16,
```
Claim 13, line 5, replace "p" with -- p'--.
```
Column 13, line 30,
```
Claim 13, line 19, replace "DELVAR=W/Var" with --DELVAR=W/VaR--.

Signed and Sealed this

Second Day of March, 1999

Attest:

Q. TODD DICKINSON

*Attesting Officer*  *Acting Commissioner of Patents and Trademarks*